(12) United States Patent
Yang et al.

(10) Patent No.: US 11,927,790 B2
(45) Date of Patent: Mar. 12, 2024

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventors: Yong Yang, Hubei (CN); Guowei Zha, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 188 days.

(21) Appl. No.: 17/600,312

(22) PCT Filed: Aug. 18, 2021

(86) PCT No.: PCT/CN2021/113226
§ 371 (c)(1),
(2) Date: Sep. 30, 2021

(87) PCT Pub. No.: WO2023/000419
PCT Pub. Date: Jan. 26, 2023

(65) Prior Publication Data
US 2023/0023817 A1 Jan. 26, 2023

(30) Foreign Application Priority Data
Jul. 21, 2021 (CN) .......................... 202110822997.9

(51) Int. Cl.
*F21V 8/00* (2006.01)

(52) U.S. Cl.
CPC .................................. *G02B 6/0051* (2013.01)

(58) Field of Classification Search
CPC .. G02B 6/0051; G02B 6/0055; G02B 6/0061; G02B 6/0021
See application file for complete search history.

(56) References Cited

U.S. PATENT DOCUMENTS

| | | | | |
|---|---|---|---|---|
| 10,078,174 | B2 * | 9/2018 | You ...................... | G02B 6/0038 |
| 10,539,733 | B2 * | 1/2020 | Yamamoto ............. | H01L 33/00 |
| 10,649,133 | B2 * | 5/2020 | Kautz ..................... | B60Q 3/64 |
| 10,852,581 | B2 * | 12/2020 | Lee ....................... | G02B 6/0088 |
| 2009/0185389 | A1 * | 7/2009 | Tessnow .............. | G02B 6/0038 362/516 |

FOREIGN PATENT DOCUMENTS

| | | |
|---|---|---|
| CN | 108287438 A | 7/2018 |
| CN | 109946874 A | 6/2019 |
| CN | 113050326 A | 6/2021 |
| CN | 113138494 A | 7/2021 |
| TW | 200842405 A | 11/2008 |
| WO | 2020101946 A1 | 5/2020 |

\* cited by examiner

*Primary Examiner* — Arman B Fallahkhair
(74) *Attorney, Agent, or Firm* — Rivka Friedman

(57) ABSTRACT

The present application discloses a backlight module and a display device. The backlight module includes a substrate and a light guide layer, the substrate has a plurality of light sources; the light guide layer is a patterned structure, and the patterned structure can change a light transmittance of the light guide layer from directly above the light sources to gaps between the light sources. The display device includes the backlight module.

20 Claims, 7 Drawing Sheets

BACKLIGHT MODULE AND DISPLAY DEVICE

BACKGROUND OF DISCLOSURE

Field of Disclosure

The present disclosure relates to a field of display, in particular to a backlight module and a display device.

Description of Prior Art

Flexible screens have technical advantages, such as bendability and flexibility, so that the flexible screens are favored by many display terminal manufacturers including mobile phones and notebook computers. Organic light-emitting diode (OLED) display technology can use flexible substrates as substrates, and has more technical advantages than liquid crystal displays (LCDs) in preparing flexible devices, while conventional liquid crystal displays cannot be as flexible as the OLEDs due to factors, such as glass substrates and backlights. However, at present, there have been exhibits or reports of flexible panels for the liquid crystal displays (LCDs). However, backlights of the liquid crystal displays cannot be bent or flexible to a large extent due to factors, such as rubber iron frames and light guide plates. The backlights of flexible liquid crystal displays (LCDs) have become a bottleneck in development of the flexible LCDs.

SUMMARY OF DISCLOSURE

A purpose of the present disclosure is to provide a backlight module and a display device, which can solve a technical problem of poor bending flexibility of a backlight module of an existing flexible liquid crystal display.

The present disclosure provides backlight module, comprising: a substrate with a plurality of light sources; and a light guide layer disposed on a side of the substrate with the light sources; the light guide layer is a patterned structure, and the patterned structure can change a light transmittance of the light guide layer from directly above the light sources to gaps between the light sources.

In addition, the backlight module further comprises: an encapsulation adhesive layer covering the side of the substrate with the light sources; and diffusion particles evenly distributed in the encapsulation adhesive layer, wherein the light guide layer is disposed on a side of the encapsulation adhesive layer away from the substrate.

In addition, the light guide layer comprises a plurality of first light guide areas and a plurality of second light guide areas; the first light guide areas are disposed opposite to the light sources; the second light guide areas are disposed opposite to gap areas between the light sources; each of the second light guide areas is located between two corresponding first light guide areas; a light transmittance of the first light guide areas is less than a light transmittance of the second light guide areas.

In addition, a light transmittance of each of the second light guide areas close to the first light guide areas is less than a light transmittance away from the first light guide areas.

In addition, the patterned structure comprises a plurality of patterned units, and each of the patterned units has openings of different sizes; an area of each opening in the first light guide areas is less than an area of each opening in the second light guide areas; and an area of each opening of the second light guide areas close to the first light guide areas is less than an area of each opening away from the first light guide areas.

In addition, a light transmittance of materials used in the light guide layer is less than or equal to 10%.

In addition, the light guide layer is made of metal materials; and the backlight module further comprises: a protective layer located between the light guide layer and the encapsulation adhesive layer; and an organic film layer disposed on a side of the light guide layer away from the protective layer, wherein a thickness of the light guide layer ranges from 100 nanometers to 600 nanometers.

In addition, the light guide layer comprises a first light guide layer and a second light guide layer; the backlight module comprises: a protective layer disposed on a side of the encapsulation adhesive layer away from the substrate; the first light guide layer disposed on a side of the protective layer away from the encapsulation adhesive layer; a planarization layer disposed on a side of the first light guide layer away from the protective layer; the second light guide layer disposed on a side of the planarization layer away from the first light guide layer; and an organic film layer disposed on a side of the second light guide layer away from the planarization layer.

In addition, openings on the first light guide layer and openings on the second light guide layer are partially overlapped or staggered. In addition, a material of the light guide layer is an organic material, and the organic material is one of white photoresist, white ink, or black matrix photoresist; colors of the first light guide layer and the second light guide layer are different; when the material of the light guide layer is the white photoresist or the white ink, a film layer thickness of the light guide layer ranges from 5 microns to 30 microns, and a reflectivity of the light guide layer is less than or equal to 90%; and when the material of the light guide layer is the black matrix photoresist, the film layer thickness of the light guide layer is less than or equal to 1 micron, the reflectivity of the light guide layer is less than or equal to 1%, and an absorption rate of the light guide layer is greater than or equal to 90%.

The present disclosure further provides a display device comprising the backlight module described above.

In addition, the display device further comprises a display panel, and the display panel is disposed opposite to the backlight module.

In addition, the display device further comprises: an encapsulation adhesive layer covering the side of the substrate with the light sources; and diffusion particles evenly distributed in the encapsulation adhesive layer, wherein the light guide layer is disposed on a side of the encapsulation adhesive layer away from the substrate.

In addition, the light guide layer comprises a plurality of first light guide areas and a plurality of second light guide areas; the first light guide areas are disposed opposite to the light sources; the second light guide areas are disposed opposite to gap areas between the light sources; each of the second light guide areas is located between two corresponding first light guide areas; a light transmittance of the first light guide areas is less than a light transmittance of the second light guide areas.

In addition, a light transmittance of each of the second light guide areas close to the first light guide areas is less than a light transmittance away from the first light guide areas.

In addition, the patterned structure comprises a plurality of patterned units, and each of the patterned units has openings of different sizes; an area of each opening in the first light guide areas is less than an area of each opening in the second light guide areas; and an area of each opening of the second light guide areas close to the first light guide areas is less than an area of each opening away from the first light guide areas.

In addition, the light guide layer is made of metal materials; and the backlight module further comprises: a protective layer located between the light guide layer and the encapsulation adhesive layer; and an organic film layer disposed on a side of the light guide layer away from the protective layer, wherein a thickness of the light guide layer ranges from 100 nanometers to 600 nanometers.

In addition, the light guide layer comprises a first light guide layer and a second light guide layer; the backlight module comprises: a protective layer disposed on a side of the encapsulation adhesive layer away from the substrate; the first light guide layer disposed on a side of the protective layer away from the encapsulation adhesive layer; a planarization layer disposed on a side of the first light guide layer away from the protective layer; the second light guide layer disposed on a side of the planarization layer away from the first light guide layer; and an organic film layer disposed on a side of the second light guide layer away from the planarization layer.

In addition, openings on the first light guide layer and openings on the second light guide layer are partially overlapped or staggered.

In addition, a material of the light guide layer is an organic material, and the organic material is one of white photoresist, white ink, or black matrix photoresist; colors of the first light guide layer and the second light guide layer are different; when the material of the light guide layer is the white photoresist or the white ink, a film layer thickness of the light guide layer ranges from 5 microns to 30 microns, and a reflectivity of the light guide layer is less than or equal to 90%; and when the material of the light guide layer is the black matrix photoresist, the film layer thickness of the light guide layer is less than or equal to 1 micron, the reflectivity of the light guide layer is less than or equal to 1%, and an absorption rate of the light guide layer is greater than or equal to 90%.

The technical effect of the present disclosure is that the patterned light guide layer is disposed on the light sources, and the light transmittance of the light guide layer increases sequentially from directly above the light sources to the gaps between the light sources, which ensures that the light emitted from the light sources is uniformly emitted from the light guide layer, and then a uniform light effect of the backlight module is ensured. At the same time, the patterned structure of the light guide layer is a microstructure, and the substrate, the chip, the encapsulation adhesive layer, etc. of the backlight module are all thinned, which improves bendability of the backlight module, and realizes a uniform backlight of a ultra-thin flexible display device

DESCRIPTION OF DRAWINGS

In order to more clearly explain the technical solutions in the embodiments of the present disclosure, the following will briefly introduce the drawings required in the description of the embodiments. Obviously, the drawings in the following description are only some embodiments of the present disclosure. For those skilled in the art, without paying any creative work, other drawings can be obtained based on these drawings.

Figure 1:
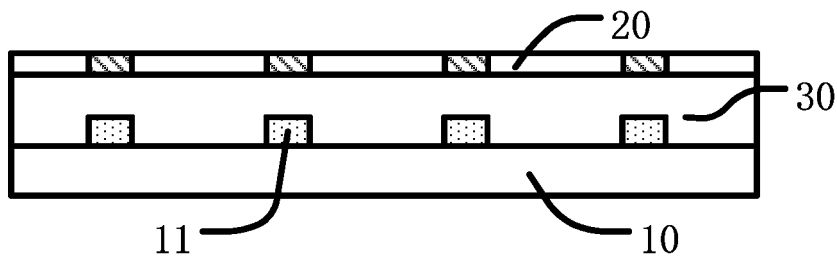
FIG. 1 is a schematic diagram of a backlight module provided by an embodiment of the present disclosure.

DESCRIPTION OF REFERENCE SIGNS 10, substrate; 20, light guide layer; 30, encapsulation adhesive layer; 40, protective layer; 50, organic film layer; 60, planarization layer;
11, light source;
31, diffusion particle; 21, patterned unit;
210, first light guide area; 220, second light guide area;
211, first light guide layer; 212, second light guide layer;
100, first brightness difference; 200, second brightness difference.

DETAILED DESCRIPTION OF EMBODIMENTS

Technical solutions in the embodiments of the present disclosure will be clearly and completely described below in conjunction with drawings in the embodiments of the present disclosure. Obviously, the described embodiments are only a part of embodiments of the present disclosure, rather than all the embodiments. Based on the embodiments in the present disclosure, all other embodiments obtained by those skilled in the art without creative work fall within the protection scope of the present disclosure. In addition, it should be understood that specific implementations described here are only used to illustrate and explain the present disclosure, and are not used to limit the present disclosure. In the present disclosure, unless otherwise stated, directional words used such as "upper" and "lower" generally refer to upper and lower directions of a device in actual use or working state, and specifically refer to drawing directions in the drawings. In addition, "inner" and "outer" refer to an outline of the device.

Embodiments of the present disclosure provide a backlight module and a display device. The backlight module comprises a substrate 10 and a light guide layer 20. The substrate 10 has a plurality of light sources 11, and the light guide layer 20 is disposed on a side of the substrate 10 with the light sources 11. The light guide layer 20 is a patterned structure, which can change light transmittance of the light guide layer 20 from directly above the light sources 11 to gaps between the light sources 11. The display device comprises the backlight module. Hereinafter, a number of embodiments are used to describe in detail. It should be noted that an order of description in following embodiments is not meant to limit a preferred order of the embodiments.

Embodiment 1

As shown in FIGS. 1 to 8, this embodiment provides a backlight module. The backlight module comprises the substrate 10, the light guide layer 20, and an encapsulation adhesive layer 30. The substrate 10 has the plurality of light sources 11, and the light guide layer 20 is disposed on the side of the substrate 10 with the light sources 11. The light guide layer 20 is a patterned structure, which can change the light transmittance of the light guide layer 20 from directly above the light sources 11 to the gaps between the light sources 11.

In this embodiment, from a perspective of thinning, the substrate 10 is preferably a flexible base substrate (polyimide, PI) or a thin glass substrate, and wires on the substrate 10 are formed by an array semiconductor process to achieve a thin design and a multi-partition design of the substrate 10. An overall thickness of the substrate 10 does not exceed 0.1 mm. A driving mode of the substrate 10 may be active or passive, which is not limited in this embodiment.

The plurality of light sources 11 are distributed on the substrate 10, and the light sources 11 are mini light-emitting diode (LED) lights. A chip in each of the mini LED lights adopts a flip chip, a sapphire base on the chip needs to be thinned, and a distributed Bragg reflection (DBR) reflective coating treatment is required by the chip sapphire base to increase a light-emitting angle of the chip, and an overall thickness of the chip is 30-60 microns.

The encapsulation adhesive layer 30 is disposed on a side of the substrate 10, and the encapsulation adhesive layer 30 is prepared by a molding process. The molding process can ensure flatness of a surface of the encapsulation adhesive layer 30 while reducing a thickness of the encapsulation adhesive layer 30, which achieves a thinning effect. Materials used for the encapsulation adhesive layer 30 is an adhesive material containing a very small amount of diffusion particles 31, and inclusion of the diffusion particles 31 can ensure that the encapsulation adhesive layer 30 has a relatively low haze property. In general, the materials used for the encapsulation adhesive layer 30 in this embodiment needs to meet characteristics of ultra-thinness, good flatness, low haze, and high transmittance.

The light guide layer 20 is disposed on a side of the encapsulation adhesive layer 30 away from the substrate 10, and the light guide layer 20 is the patterned structure. In this embodiment, the light guide layer 20 is disposed on an upper surface of the encapsulation adhesive layer 30, and the light guide layer 20 is the patterned structure.

The light guide layer 20 is a high reflectivity film layer, and a film layer thickness of the light guide layer 20 is not more than 10 microns. The light guide layer 20 has patterned properties of photolithography and development. In this embodiment, materials used for the light guide layer 20 are materials with high reflectivity and low light transmittance. The materials of the light guide layer 20 can be metal materials, and the metal materials are preferably aluminum and silver. A thickness of the light guide layer 20 is 100 to 600 nanometers, and reflectivity of the light guide layer 20 is greater than 93%, in other words, light transmittance of the light guide layer 20 is less than or equal to 10%.

Figure 5:
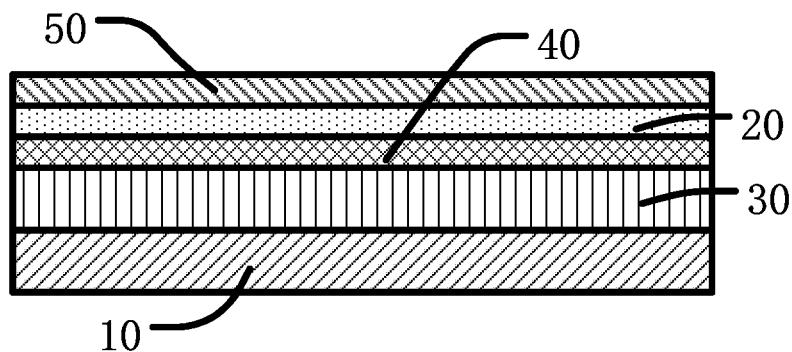
FIG. 5 is a schematic structural diagram of a backlight module when a material of a light guide layer is a metal material provided by Embodiment 1 of the present disclosure.

As shown in FIG. 5, in this embodiment, the backlight module further comprises: a protective layer 40 and an organic film layer 50.

The protective layer 40 is located between the light guide layer 20 and the encapsulation adhesive layer 30. To ensure that the encapsulation adhesive layer 30 under the protective layer 40 is not affected by acids, alkalis, and organic solvents, a film layer thickness of the protective layer 40 is not more than 10 microns, and light transmittance of the protective layer 40 is more than 95%.

The organic film layer 50 is located on a side of the light guide layer 20 away from the protective layer 40, that is, on an upper surface of the light guide layer 20. The organic film layer 50 can protect metal film layers below, that is, the light guide layer 20, from being oxidized, and at the same time, the organic film layer 50 can also ensure that a surface of the backlight module is not scratched, thereby improving scratch resistance performance of the backlight module.

Figure 2:
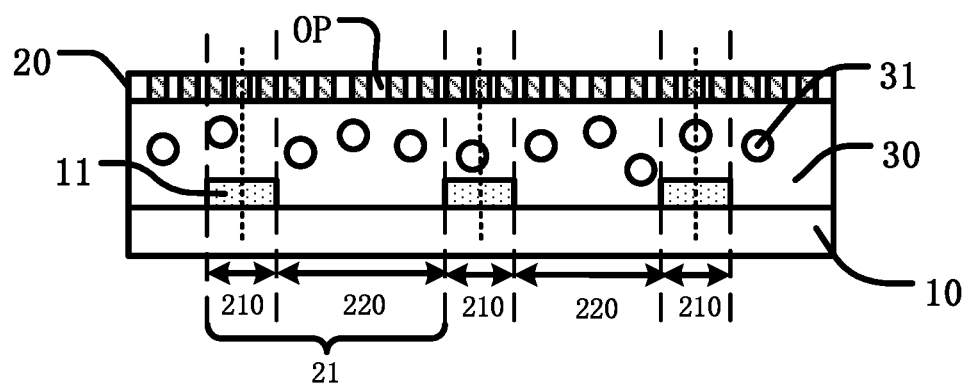
FIG. 2 is a detailed structural diagram of the backlight module provided by the embodiment of the present disclosure.

As shown in FIG. 2, the light guide layer 20 comprises a plurality of first light guide areas 210 and a plurality of second light guide areas 220. The first light guide areas 210 are located directly above the light sources 11, that is, each of the light guide areas 210 is arranged opposite to a corresponding light source 11. The second light guide areas 220 are arranged opposite to gap areas between the light sources 11, that is, each second light guide area 220 is arranged opposite to a gap area between two corresponding adjacent light sources 11. That is to say, an orthographic projection of each of the second light guide areas 220 on the substrate 10 is located between two light sources 11. Each second light guide area 220 is located between two corresponding first light guide areas 210, and the second light guide areas 220 are arranged around the first light guide areas 210.

In this embodiment, one first light guide area 210 and one second light guide area 220 will be taken as an example to describe distribution and arrangement of the light guide layer 20 in detail.

The patterned structure comprises a plurality of patterned units 21, and each of the patterned units has openings OPs of different sizes, and light will exit through the openings OPs.

Figure 4:
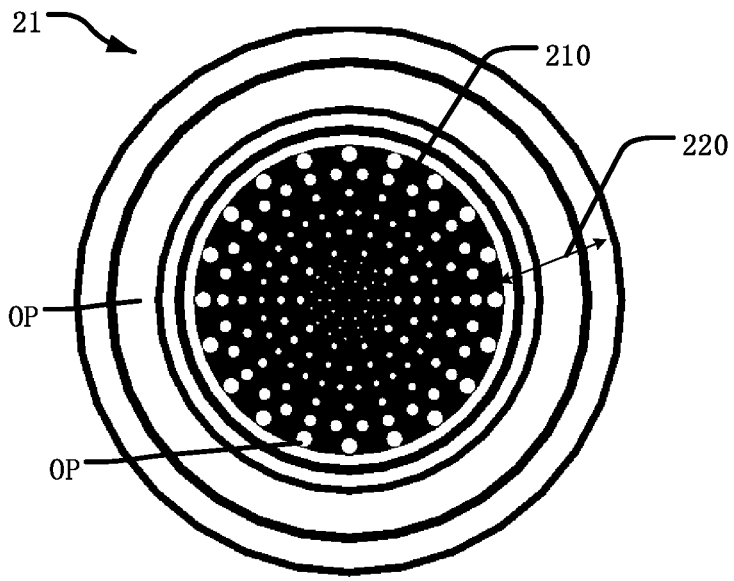
FIG. 4 is a schematic diagram of a patterned unit provided by the embodiment of the present disclosure.

As shown in FIG. 4, an area of each of the openings OPs in the first light guide area 210 is less than an area of each of the openings OPs in the second light guide area 220, and the closer a portion of the second light guide area 220 is to the first light guide area 220, the smaller an area of an opening OP in the portion is, that is, an area of an opening OP of the second light guide area 220 close to the first light guide area 210 is less than an area of an opening OP away from the second light guide area 220, which is equivalent to that during a procedure of extending from a center of the first light guide area 210 to periphery, the area of the opening OP presents a gradually increasing trend. At this time, during extending from the first light guide area 210 to the second light guide area 220, light comprehensive transmittance of the light guide layer 20 gradually increases, and at the same time, from a light socket of the light sources 11 to the gaps between the light sources, light energy loss decreases successively due to conduction.

Figure 3:
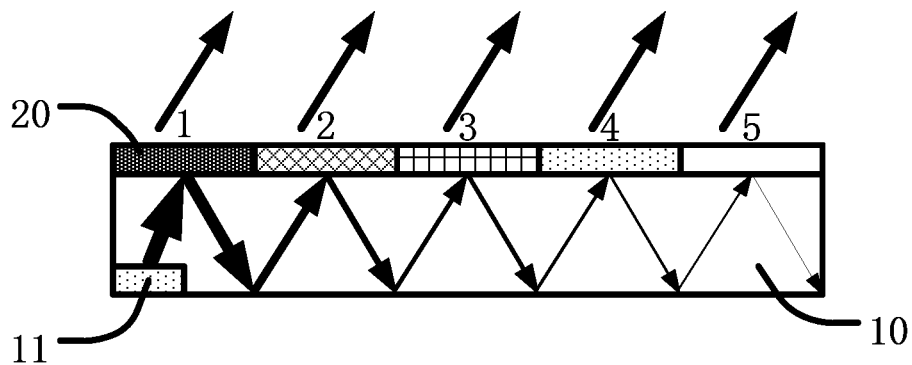
FIG. 3 is a schematic diagram of a principle of light mixing of a light source through a patterned structure provided by the embodiment of the present disclosure.

As shown in FIG. 3, assuming that light transmittances of the light guide layer 20 at positions 1-5 are $T_1$, $T_2$, $T_3$, $T_4$, and $T_5$, light energy of optical waveguide of the light sources 11 at positions 1-5 is $E_1$, $E_2$, $E_3$, $E_4$, and $E_5$, and it must meet $T_1<T_2<T_3<T_4<T_5$, $E_1>E_2>E_3>E_4>E_5$, and $T_1*E_1=T_2*E_2=T_3*E_3=T_4*E_4=T_5*E_5$, that is to ensure that light emission energy of the substrate 10 and the light sources 11 at different positions is equal or approximately equal. Therefore, the comprehensive transmittance at different positions of the light guide layer 20 is related to energy of optical waveguide at the positions, that is, related to factors such as a light emission type of the chip of the light sources 11, the thickness of the encapsulation adhesive layer 30, and reflectivity of the substrate 10.

As shown in FIG. 4, a center point of the first light guide area 210 coincides with a center point of the chip of the light sources 11 in a vertical direction, that is, the center point of the first light guide area 210 and the center point of the chip are on a same central axis. Extending outward from the central axis, the area of the openings OPs of the patterned units 21 is larger toward outside, and the area of the openings OPs of the patterned units 21 closer to a central axis area is smaller.

Figure 6:
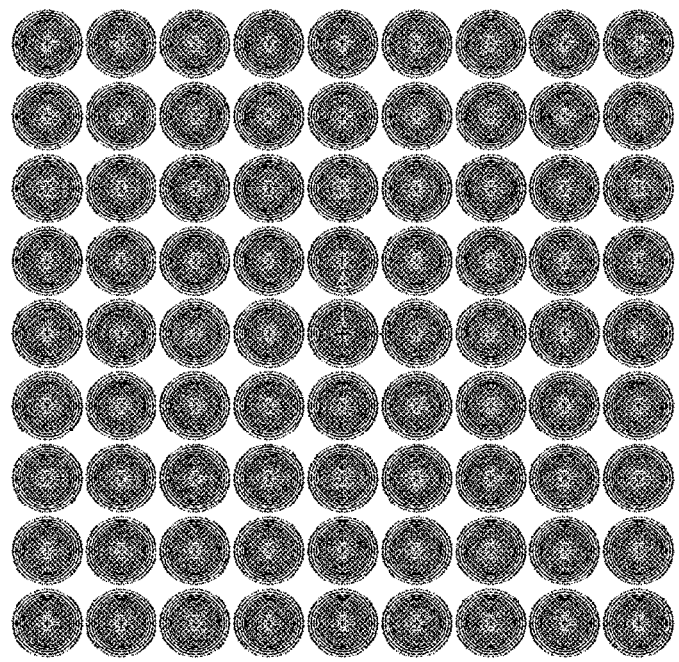
FIG. 6 is a schematic diagram of simulation without shading dots between patterned units provided by an embodiment of the present disclosure.
Figure 7:
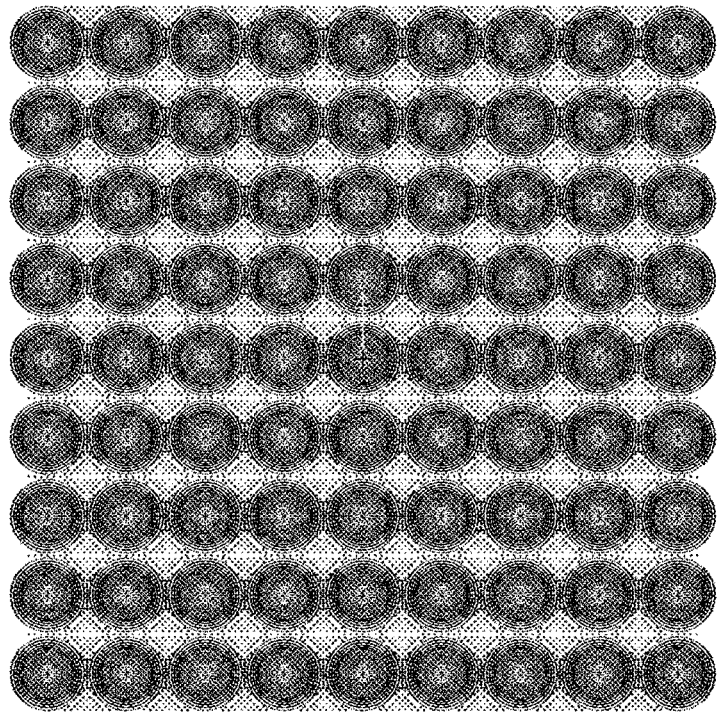
FIG. 7 is a schematic diagram of simulation with shading dots between patterned units provided by an embodiment of the present disclosure.

As shown in FIGS. 6 and 7, the patterned units 21 are distributed in an array. Assuming that a width of the gap between two light sources 11 is D and a length of the chip of each of the light sources 11 is L, then horizontal and vertical spaces between the patterned units 21 are 0~(DL), and some shading dots (see FIG. 7) may be distributed between the patterned units 21. The shading dots are used to adjust light emitted from the gaps of the light sources 11. Alternatively, there can be no shading dot (see FIG. 6).

Assuming that transmittance of a material used for the light guide layer 20 is $T_0$ and a ratio of an opening in a radial area is n %, an comprehensive transmittance of the patterned units 21 on a radial circumference is $(1-n\%)*100\%+T_0*n\%$. Sizes of the openings of the patterned units 21 in different radial directions need to be comprehensively determined according to light energy of positions and an arrangement of the chips of the light sources 11, which will not be described in detail here.

Through different opening area distribution, an effect of gradually changed light transmittance of light on the light guide layer 20 can be achieved, which can effectively prevent a problem of uneven light emission resulted from light emitted from the light sources 11 being concentrated above the light sources and an amount of light exited at a gap between two light sources 11 being small, ensure that light emission energy of the light sources 11 at different positions is equal or approximately equal, and realize a uniform light effect of the light sources 11 over a larger area.

A shape of the patterned units 21 can be set according to arrangement rules of the light sources 11 on the substrate 10. The shape of the patterned units 21 can be a square, a circle, a triangle, a polygon, a rhombus, etc. In this embodiment, a circle is taken as an example (see FIG. 4).

At the same time, sizes of the patterned units 21 are not less than a size of the chips in the light sources 11, and not greater than sizes of intervals where the light sources 11 are arranged, that is, an area of an orthographic projection of each of the patterned units 21 on the substrate 10 covers each of the light sources 11, and a boundary of the orthographic projections of the patterned units 21 on the substrate 10 is located in gap areas on both sides of the light sources 11. A shape of opening patterns in the patterned units 21 may be a square, a circle, a triangle, a polygon, a ring, or an arc, and the shape is selected according to actual process requirements and a ratio of an opening of a radial position.

In this embodiment, taking a photoresist material as a high reflectivity light guide layer as an example, a protective adhesive layer is prepared on the substrate 10, and a layer of the photoresist material is spin-coated on an upper surface of the protective adhesive layer. A film layer thickness of the photoresist material is positively related to reflectivity, and the process is controlled by a rotation speed. Then, a semiconductor process is used to pattern a surface of the photoresist to form a plurality of openings. During the opening process, the closer to the light sources 11, the smaller the openings, and the farther away the light sources 11, the larger the openings, so a gradually changed procedure is formed. Finally, a cleaning process is used to remove excess photoresists to form a patterned structure. Referring to FIG. 4 for a schematic diagram of a distribution of one patterned unit 21 in the patterned structure.

Figure 8:
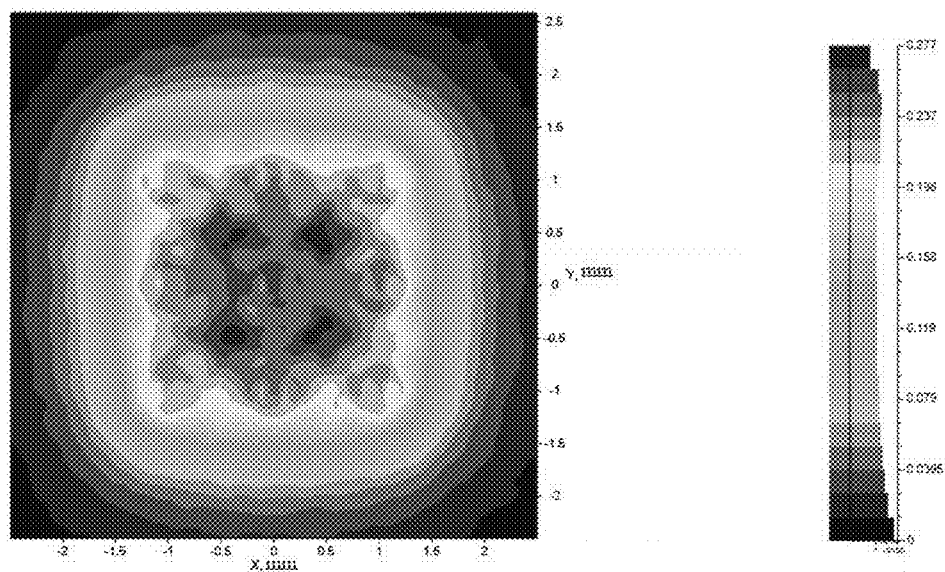
FIG. 8 is a simulation result diagram of the light guide layer provided by the embodiment of the present disclosure.

As shown in FIG. 8, in this embodiment, an optical software is used to model a 3*3 array of light sources for simulation. Assuming that the width D of the gaps between the light sources 11 is set to 1 mm, a thickness of the protective adhesive layer is 0.2 mm, and an ink reflectivity of the substrate 10 is set to 85%. The light guide layer 20 made under these parameters has a uniform thickness on an entire surface. By controlling hole density and a hole size, different levels of gradient reflectivity can be achieved. Through simulation of uniformity of spatial illuminance, a simulation result shows that a uniform light mixing on the entire surface of the substrate 10 can be achieved through the above-mentioned design idea of the light guide layer with the gradient reflectivity.

This embodiment also provides a display device, which comprises the backlight module as described above. The display device further comprises a display panel, the backlight module can achieve the uniform light mixing, and the display panel can achieve a display effect. The display device is a flexible liquid crystal display, and on a basis of reducing a thickness of the backlight module, the backlight module can be bent, thereby improving bendability of the flexible liquid crystal display.

A technical effect of the backlight module and the display device of this embodiment is that the patterned light guide layer is disposed on the light sources, and the light transmittance of the light guide layer increases sequentially from directly above the light sources to the gaps between the light sources, which ensures that the light emitted from the light sources is uniformly emitted from the light guide layer, and then the uniform light effect of the backlight module is ensured. At the same time, the patterned structure of the light guide layer is a microstructure, and the substrate, the chip, the encapsulation adhesive layer, etc. of the backlight module are all thinned, which improves the bendability of the backlight module, and realizes uniform backlight of an ultra-thin flexible display device.

Embodiment 2

As shown in FIGS. 1 to 4 and FIGS. 6 to 12, this embodiment provides a backlight module, which is a direct type backlight module. The backlight module comprises a substrate 10, a light guide layer 20, and an encapsulation adhesive layer 30. The substrate 10 has the plurality of light sources 11, and the light guide layer 20 is disposed on the side of the encapsulation adhesive layer 30. The light guide layer 20 is the patterned structure.

In this embodiment, the substrate 10 may be one of a flexible circuit board (FPC), a printed circuit board (PCB), a glass substrate, or a flexible base substrate (PI). From the perspective of device thinning, the substrate 10 is preferably a flexible circuit board and a flexible base substrate. The wires on the substrate 10 are formed by the array semiconductor process to achieve the thin design and the multi-partition design of the substrate 10. The overall thickness of the substrate 10 does not exceed 0.1 mm. The driving mode of the substrate 10 may be active or passive, which is not limited in this embodiment.

The plurality of light sources 11 are distributed on the substrate 10, and the light sources 11 are the mini LED lights. The chip in each mini LED light can be a large angle chip or a common angle chip, and a chip size can be 0305, 0408, 0509, 0620, etc. The chip on the substrate 10 may be a blue chip or an RGB three-color chip, and the DBR reflective coating treatment is required by a base of the chip to increase a light-emitting angle of the chip, and an overall thickness of the chip is 30-60 microns.

The encapsulation adhesive layer 30 is disposed on a side of the substrate 10, and the encapsulation adhesive layer 30 is prepared by the molding process. The molding process can ensure the flatness of the surface of the encapsulation adhesive layer 30 while reducing the thickness of the encapsulation adhesive layer 30. The thickness of the encapsulation adhesive layer is less than 0.2 mm, which can achieve the effect of thinning. The surface flatness of the encapsulation adhesive layer 30 is good, and the surface flatness of the encapsulation adhesive layer 30 is less than or equal to 5 microns.

The materials used for the encapsulation adhesive layer 30 is the adhesive material containing a very small amount of the diffusion particles 31, and the diffusion particles 31 can damage a total reflection of light in the encapsulation adhesive layer 30 to a certain extent, improve efficiency of light extraction, and ensure that the encapsulation adhesive layer 30 has a relatively low haze property. In general, the materials used for the encapsulation adhesive layer 30 in this embodiment need to meet characteristics of ultra-thinness, good flatness, low haze, and high transmittance.

The light guide layer 20 is disposed on a side of the encapsulation adhesive layer 30, and the light guide layer 20 is the patterned structure. In this embodiment, the light guide layer 20 is disposed on the upper surface of the encapsulation adhesive layer 30, and the light guide layer 20 is the patterned structure.

The light guide layer 20 is a high reflectivity and low transmittance film layer. A film layer thickness of the light guide layer 20 is not more than 10 microns and ranges from 0.1 microns to 10 microns. At the same time, the light guide layer 20 has patterned properties of photolithography and development. In this embodiment, the materials of the light guide layer 20 can be organic materials, and the organic materials comprise at least one of white ink, white photoresists, organic polyester polymer materials, or black matrix.

Figure 9:
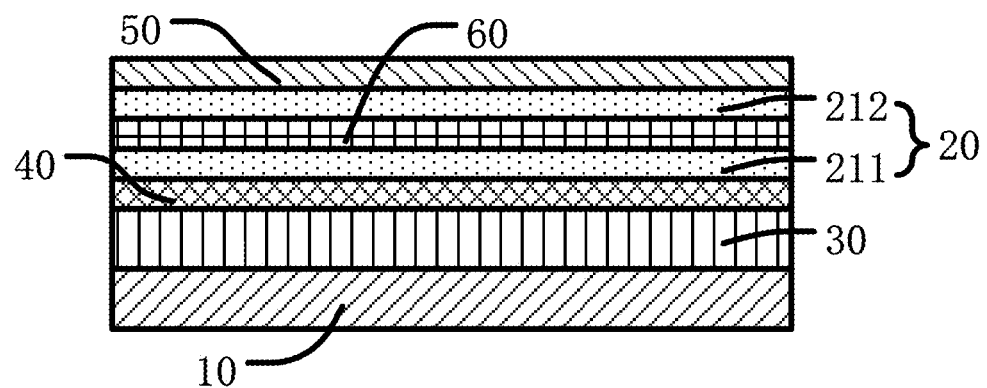
FIG. 9 is a schematic structural diagram of a backlight module when a material of a light guide layer is an organic material provided by Embodiment 2 of the present disclosure.

As shown in FIG. 9, when the materials of the light guide layer 20 is the organic materials, the backlight module further comprises: the protective layer 40, the organic film layer 50, and a planarization layer 60. At the same time, the light guide layer 20 may comprises one or at least two light guide layers 20. In this embodiment, two light guide layers 20 are taken as an example, which are a first light guide layer 211 and a second light guide layer 212, respectively.

The protective layer 40 is disposed on a side of the encapsulation adhesive layer 30 away from the substrate 10, so as to ensure that the encapsulation adhesive layer 30 under the protective layer 40 is not affected by acids, alkalis, and organic solvents, the film layer thickness of the protective layer 40 is not more than 10 microns, and the light transmittance of the protective layer is more than 95%.

The first light guide layer 211 is disposed on a side of the protective layer 40 away from the encapsulation adhesive layer 30, that is, on an upper surface of the protective layer 40.

The planarization layer 60 is disposed on a side of the first light guide layer 211 away from the protective layer 40, that is, on an upper surface of the first light guide layer 211. A main function of the planarization layer 60 is to level the film layer where the first light guide layer 211 is located, so as to ensure that the second light guide layer 212 above the planarization layer 60 can be smoothly prepared on the planarization layer 60.

The organic film layer 50 is disposed on a side of the second light guide layer 212 away from the planarization layer 60, that is, on an upper surface of the second light guide layer 212. The organic film layer 50 can ensure that the surface of the backlight module is not scratched and improve the scratch resistance performance of the backlight module.

The organic material is one of the white photoresists, the white ink, or black matrix photoresists; colors of the first light guide layer 211 and the second light guide layer 212 are different.

When the material of the light guide layer 20 is the white photoresists or the white ink, the film layer thickness of the light guide layer 20 is 5-30 microns, and the reflectivity of the light guide layer 20 is less than or equal to 90%.

When the material of the light guide layer 20 is the black matrix photoresists, the film layer thickness of the light guide layer 20 is less than or equal to 1 micron, the reflectivity of the light guide layer 20 is less than or equal to 1%, and an absorption rate of the light guide layer 20 is greater than or equal to 90%.

As shown in FIG. 2, the light guide layer 20 comprises the plurality of first light guide areas 210 and the plurality of second light guide areas 220. Each first light guide area 210 is located directly above each light source 11, that is, each first light guide area 210 is arranged opposite to each light source 11. Each second light guide areas 220 are arranged opposite to the gap area between two adjacent light sources 11, that is, the orthographic projection of each of the second light guide areas 220 on the substrate 10 is located between two light sources 11. Each second light guide area 220 is located between two first light guide areas 210, and the second light guide areas 220 are arranged around the first light guide areas 210.

Figure 13:
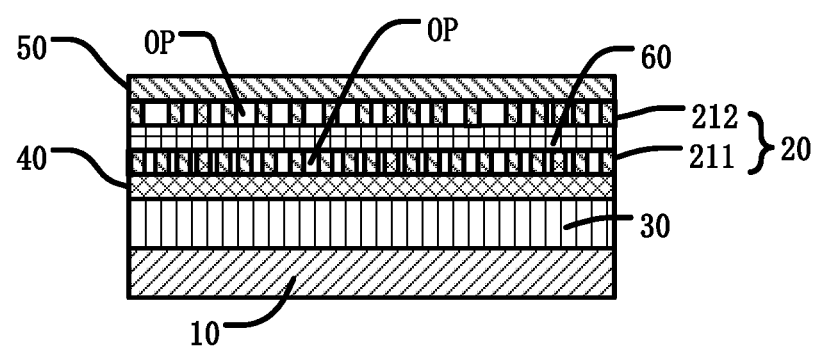
FIG. 13 is a schematic structural diagram of a backlight module when a material of a light guide layer is an organic material provided by Embodiment 2 of the present disclosure.

The first light guide layer 211 and the second light guide layer 212 have a same structure, and openings OPs on the first light guide layer 211 and openings OPs on the second light guide layer 212 may be partially overlapped, or may be completely staggered, as shown in FIG. 13. In this embodiment, one first light guide area 210 and one second light guide area 220 will be taken as an example to describe the distribution and arrangement of the light guide layer 20 in detail.

The patterned structure comprises the plurality of patterned units 21, each of which has openings OPs of different sizes, and light will exit through the openings OPs.

As shown in FIG. 4, the area of each the opening OP in the first light guide area 210 is less than the area of each of the openings OPs in the second light guide area 220, and the closer a portion of the second light guide area 220 is to the first light guide area 210, the smaller the area of the opening OP in the portion, that is, the area of the opening OP of the second light guide area 220 close to the first light guide area 210 is less than the area of the opening OP away from the second light guide area 220, which is equivalent to that during the procedure of extending from the center of the first light guide area 210 to periphery, the area of the opening OP presents a gradually increasing trend. At this time, during extending from the first light guide area 210 to the second light guide area 220, the light comprehensive transmittance of the light guide layer 20 gradually increases, and at the same time, from the light socket of the light sources 11 to the gaps between the light sources, light energy loss decreases successively due to conduction.

As shown in FIG. 3, assuming that the light transmittances of the light guide layer 20 at positions 1-5 are $T_1$, $T_2$, $T_3$, $T_4$, and $T_5$, light energy of the optical waveguide of the light sources 11 at positions 1-5 is $E_1$, $E_2$, $E_3$, $E_4$, and $E_5$, and it must meet $T_1<T_2<T_3<T_4<T_5$, $E_1>E_2>E_3>E_4>E_5$, and $T_1*E_1=T_2*E_2=T_3*E_3=T_4*E_4=T_5*E_5$, that is to ensure that light emission energy of the substrate 10 and the light sources 11 at different positions is equal or approximately equal. Therefore, the comprehensive transmittance at different positions of the light guide layer 20 is related to the energy of the optical waveguide at the positions, that is, related to factors such as a light emission type of the chip of the light sources 11, the thickness of the encapsulation adhesive layer, and the reflectivity of the substrate 10.

As shown in FIG. 4, the center point of the first light guide area 210 coincides with the center point of the chip of the light sources 11 in the vertical direction, that is, the center point of the first light guide area 210 and the center point of the chip are on a same central axis. Extending outward from the central axis, the area of the openings OPs of the patterned units 21 is larger toward the outside, and the area of the openings OPs of the patterned units 21 closer to the central axis area is smaller.

As shown in FIGS. 6 and 7, the patterned units 21 are distributed in an array. Assuming that a width of a gap between two light sources 11 is D and the length of the chip of each of the light sources 11 is L, then horizontal and vertical spaces between the patterned units 21 are 0~(D-L), and some shading dots (see FIG. 7) may be distributed between the patterned units 21, and the shading dots are used to adjust the light exited from the light sources 11. Alternatively, there can be no shading dot (see FIG. 6).

Assuming that transmittance of the material used for the light guide layer 20 is $T_0$ and a ratio of an opening in a radial area is n %, the overall transmittance of the patterned units 21 on the radial circumference is (1−n %)*100%+$T_0$*n %. Sizes of the openings of the patterned units 21 in different radial directions need to be comprehensively determined according to the light energy of the positions and the arrangement of the chips of the light sources 11, which will not be described in detail here.

Through different opening area distribution, an effect of gradually changed light transmittance of light on the light guide layer 20 can be achieved, which can effectively prevent a problem of uneven light emission resulted from the light emitted from the light sources 11 being concentrating above the light sources and an amount of light exited at the gap between two light sources 11 being small, ensure that the light emission energy of the light sources 11 at different positions is equal or approximately equal, and realize uniform light effect of the light sources 11 over a larger area.

A shape of the patterned units 21 can be set according to arrangement rules of the light sources 11 on the substrate 10. The shape of the patterned units 21 can be a square, a circle, a triangle, a polygon, a rhombus, etc. In this embodiment, a circle is taken as an example (see FIG. 4).

At the same time, the sizes of the patterned units 21 are not less than the size of the chips in the light sources 11, and not greater than the sizes of the intervals where the light sources 11 are arranged, that is, an area of an orthographic projection of each of the patterned units 21 on the substrate 10 covers each of the light sources 11, and a boundary of the orthographic projections of the patterned units 21 on the substrate 10 is located in the gap areas on both sides of the light sources 11. A shape of the opening patterns in the patterned units 21 may be a square, a circle, a triangle, a polygon, a ring, or an arc, and the shape is selected according to actual process requirements and a ratio of an opening of the radial position.

The material used for the light guide layer 20 is a material with high reflectivity and low light transmittance, and the light transmittance of the light guide layer 20 is less than or equal to 10%.

As shown in FIG. 8, in this embodiment, the optical software is used to model a 3*3 array of light sources for simulation. Assuming that the width D of the gaps between the light sources 11 is set to 1 mm, the thickness of the protective adhesive layer is 0.2 mm, and the ink reflectivity of the substrate 10 is set to 85%. The light guide layer 20 made under these parameters has a uniform thickness on the entire surface. By controlling hole density and hole sizes, different levels of gradient reflectivity can be achieved. Through simulation of uniformity of spatial illuminance, the simulation result shows that the uniform light mixing on the entire surface of the substrate 10 can be achieved through the above-mentioned design idea of the light guide layer with the gradient reflectivity.

Figure 10:
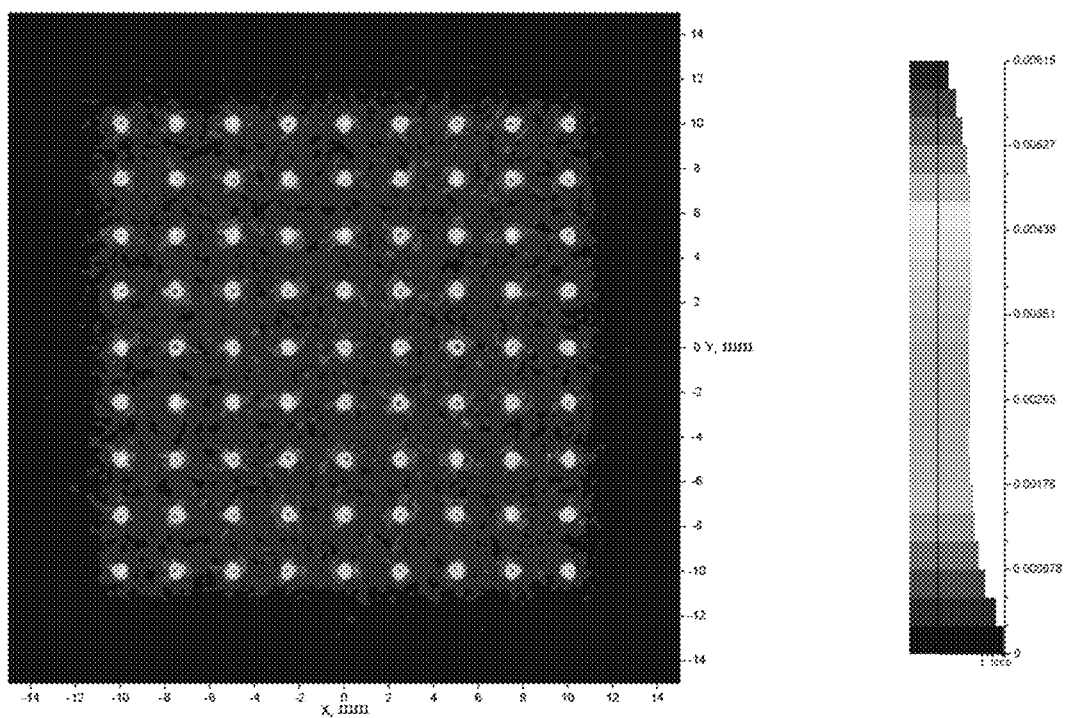
FIG. 10 is a brightness simulation diagram of a light guide layer without patterned units in the prior art.

FIG. 10 shows a simulation result of an entire surface of the light guide layer with. It can be seen from the figure that the light sources are independent and uniformity is extremely poor. A first brightness difference 100 in FIG. 12 refers to a brightness difference between the light sources with no patterned structure above and the gaps between two light sources, and it is obviously that the first brightness difference 100 has a large value.

Figure 11:
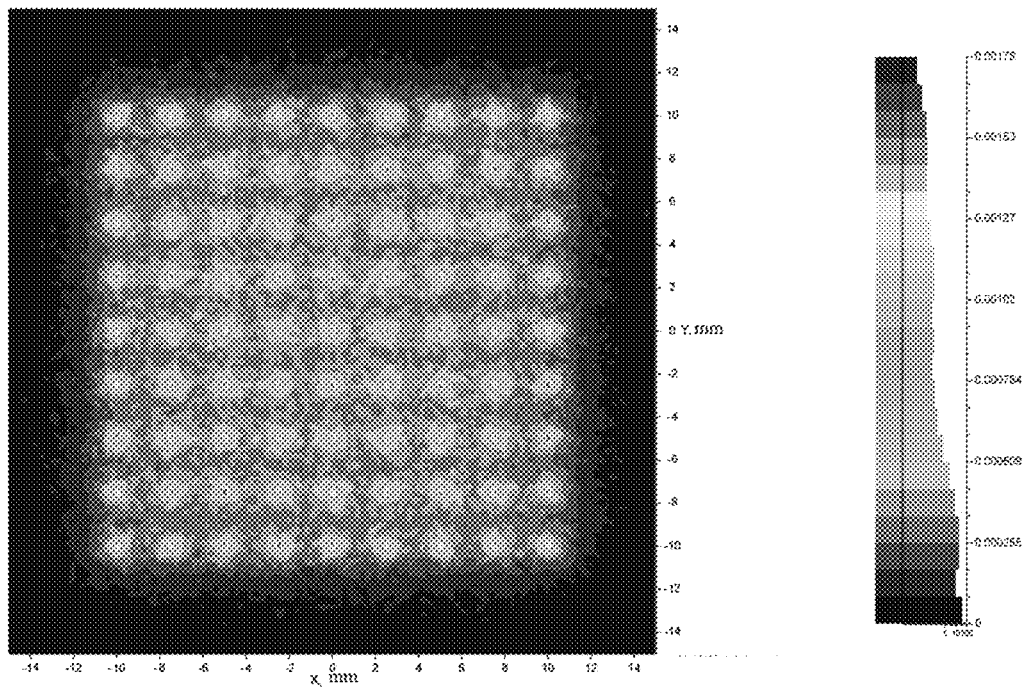
FIG. 11 is a brightness simulation diagram of a light guide layer with the patterned units provided by the embodiment of the present disclosure.
Figure 12:
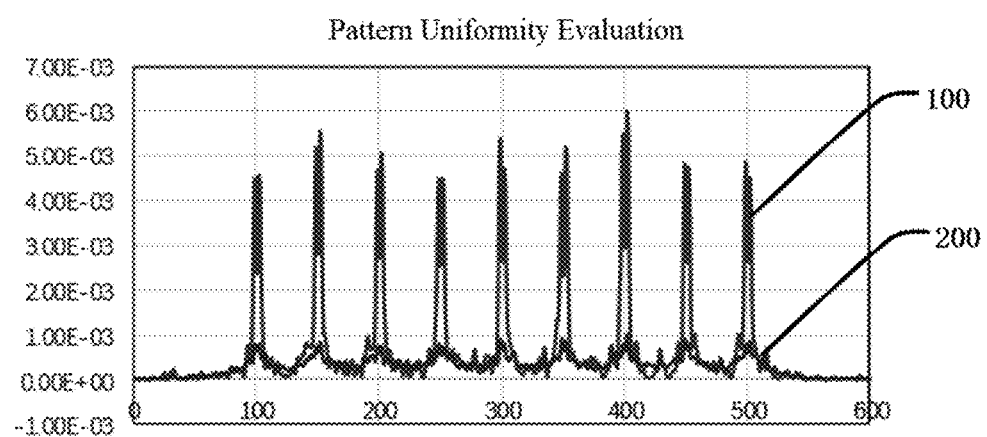
FIG. 12 is an evaluation diagram of a brightness difference between a light source and a gap between two light sources provided by the embodiment of the present disclosure.

FIG. 11 shows a simulation result of the light guide layer being the patterned structure. It can be seen from the figure that light spots are no longer completely independent, and there is obvious light emission in the gaps between two light sources, and the uniformity is obviously improved, which achieves uniform light mixing on the entire surface of the substrate. Referring to FIG. 12 again, a second brightness difference 200 is significantly reduced, and it can be seen that the brightness difference between the light sources and the gaps between two light sources is reduced, that is, the brightness uniformity is significantly improved.

This embodiment also provides a display device, which comprises the backlight module as described above. The display device further comprises a display panel, the backlight module can achieve the uniform light mixing, and the display panel can achieve the display effect. The display device is the flexible liquid crystal display, and on the basis of reducing the thickness of the backlight module, the backlight module can be bent, thereby improving the bendability of the flexible liquid crystal display.

The technical effect of the backlight module and the display device of this embodiment is that the patterned light guide layer is disposed on the light sources, and the light transmittance of the light guide layer increases sequentially from directly above the light sources to the gaps between the light sources, which ensures that the light emitted from the light sources is uniformly emitted from the light guide layer, brightness distribution is more uniform, and then the uniform light effect of the backlight module is ensured. At the same time, the patterned structure of the light guide layer is a microstructure, and the substrate, the chip, the encapsulation adhesive layer, etc. of the backlight module are all thinned, which improves the bendability of the backlight module, and realizes the uniform backlight of the ultra-thin flexible display device.

The backlight module and the display device provided in the embodiments of the present disclosure are described in detail above. In the present disclosure, specific embodiments are used to explain principles and implementation of the present disclosure, and the description of the above embodiments is only used to help understand the technical solutions and core ideas of the present disclosure; at the same time, for those skilled in the art, according to the idea of the present disclosure, there will be changes in the specific implementation and the scope of the present disclosure. In summary, the content of this specification should not be construed as a limitation to the present disclosure.

What is claimed is:

1. A backlight module comprising: a substrate; a plurality of light sources disposed on the substrate in an array; a light guide layer disposed above the light sources; wherein the light guide layer is a patterned structure, and the patterned structure is configured to change a light transmittance of the light guide layer from directly above the light sources to gaps between the light sources, wherein a light transmittance of materials used in the light guide layer is less than or equal to 10%, wherein the patterned structure comprises a plurality of patterned units arranged in an array, a center of each of the patterned units is arranged opposite to a corresponding one of the light sources, and each of the patterned units comprises a plurality of openings of different sizes, and areas of the openings are gradually increased from the center to a periphery of each of the patterned units.

2. The backlight module of claim 1, wherein the backlight module further comprises:
an encapsulation adhesive layer covering a side of the substrate with the light sources; and
diffusion particles evenly distributed in the encapsulation adhesive layer,
wherein the light guide layer is disposed on a side of the encapsulation adhesive layer away from the substrate.

3. The backlight module of claim 2, wherein the light guide layer comprises a first light guide layer and a second light guide layer;
the backlight module comprises:
a protective layer disposed on a side of the encapsulation adhesive layer away from the substrate;
the first light guide layer disposed on a side of the protective layer away from the encapsulation adhesive layer;
a planarization layer disposed on a side of the first light guide layer away from the protective layer;
the second light guide layer disposed on a side of the planarization layer away from the first light guide layer; and
an organic film layer disposed on a side of the second light guide layer away from the planarization layer.

4. The backlight module of claim 3, wherein:
the first light guide layer comprises a plurality of first openings, and the second light guide layer comprises a plurality of second openings, and
the first openings in the first light guide layer and the second openings in the second light guide layer are partially overlapped or staggered.

5. The backlight module of claim 3, wherein:
a material of the light guide layer is an organic material, and the organic material is one of white photoresist, white ink, or black matrix photoresist;
colors of the first light guide layer and the second light guide layer are different;
when the material of the light guide layer is the white photoresist or the white ink, a film layer thickness of the light guide layer ranges from 5 microns to 30 microns, and a reflectivity of the light guide layer is less than or equal to 90%; and
when the material of the light guide layer is the black matrix photoresist, the film layer thickness of the light guide layer is less than or equal to 1 micron, the reflectivity of the light guide layer is less than or equal to 1%, and an absorption rate of the light guide layer is greater than or equal to 90%.

6. The backlight module of claim 2, wherein the light guide layer is made of metal materials; and the backlight module further comprises:
a protective layer located between the light guide layer and the encapsulation adhesive layer; and
an organic film layer disposed on a side of the light guide layer away from the protective layer,
wherein a thickness of the light guide layer ranges from 100 nanometers to 600 nanometers.

7. The backlight module of claim 1, wherein:
each of the patterned units comprises a first light guide area and a second light guide area;
the first light guide area is arranged opposite to a corresponding one of the light sources;
the second light guide area is arranged opposite to a gap area between corresponding two adjacent light sources of the light sources;
the second light guide area is located around the first light guide area;
a light transmittance of the first light guide area is less than a light transmittance of the second light guide area.

8. The backlight module of claim 7, wherein:
a light transmittance of a part of the second light guide area close to the first light guide area is less than a light transmittance of a part of the second light guide area away from the first light guide area.

9. The backlight module of claim 7, wherein:
an area of each of a portion of the openings in the first light guide area is less than an area of each of a portion of the openings in the second light guide area; and
an area of an opening of the portion of the openings in the second light guide area close to the first light guide area is less than an area of an opening of the portion of the openings in the second light guide area away from the first light guide area.

10. The backlight module of claim 7, wherein, each of a portion of the openings in the first light guide area is a circle shape, and each of a portion of the openings in the second light guide area is a ring shape, and the patterned structure further comprises a gap area between the plurality of patterned units, and the gap area is a transparent area, or comprises a transparent area and a plurality of light-shielding dots arranged in the transparent area.

11. A display device comprising a backlight module, wherein, the backlight module comprises a substrate; a plurality of light sources disposed on the substrate in an array; a light guide layer disposed at a side of the substrate with the light sources; wherein the light guide layer is a patterned structure, and the patterned structure is configured to change a light transmittance of the light guide layer from directly above the light sources to gaps between the light sources, wherein a light transmittance of materials used in the light guide layer is less than or equal to 10%, wherein the patterned structure comprises a plurality of patterned units arranged in an array, a center of each of the patterned units is arranged opposite to a corresponding one of the light sources, and each of the patterned units comprises a plurality of openings of different sizes, and areas of the openings are gradually increased from the center to a periphery of each of the patterned units.

12. The display device of claim 11, wherein the backlight module further comprises:
an encapsulation adhesive layer covering a side of the substrate with the light sources; and
diffusion particles evenly distributed in the encapsulation adhesive layer,
wherein the light guide layer is disposed on a side of the encapsulation adhesive layer away from the substrate.

13. The display device of claim 12, wherein the light guide layer comprises a first light guide layer and a second light guide layer;
the backlight module comprises:
a protective layer disposed on a side of the encapsulation adhesive layer away from the substrate;
the first light guide layer disposed on a side of the protective layer away from the encapsulation adhesive layer;
a planarization layer disposed on a side of the first light guide layer away from the protective layer;
the second light guide layer disposed on a side of the planarization layer away from the first light guide layer; and
an organic film layer disposed on a side of the second light guide layer away from the planarization layer.

14. The display device of claim 13, wherein:
the first light guide layer comprises a plurality of first openings, and the second light guide layer comprises a plurality of second openings, and
the first openings in the first light guide layer and the second openings in the second light guide layer are partially overlapped or staggered.

15. The display device of claim 13, wherein:
a material of the light guide layer is an organic material, and the organic material is one of white photoresist, white ink, or black matrix photoresist;
colors of the first light guide layer and the second light guide layer are different;
when the material of the light guide layer is the white photoresist or the white ink, a film layer thickness of the light guide layer ranges from 5 microns to 30 microns, and a reflectivity of the light guide layer is less than or equal to 90%; and
when the material of the light guide layer is the black matrix photoresist, the film layer thickness of the light guide layer is less than or equal to 1 micron, the reflectivity of the light guide layer is less than or equal to 1%, and an absorption rate of the light guide layer is greater than or equal to 90%.

16. The display device of claim 12, wherein the light guide layer is made of metal materials; and the backlight module further comprises:
a protective layer located between the light guide layer and the encapsulation adhesive layer; and
an organic film layer disposed on a side of the light guide layer away from the protective layer,
wherein a thickness of the light guide layer ranges from 100 nanometers to 600 nanometers.

17. The display device of claim 11, wherein:
each of the patterned units comprises a first light guide area and a second light guide area;
the first light guide area is arranged opposite to a corresponding one of the light sources;
the second light guide area is arranged opposite to a gap area between corresponding two adjacent light sources of the light sources;
the second light guide area is located around the first light guide area;
a light transmittance of the first light guide area is less than a light transmittance of the second light guide area.

18. The display device of claim 17, wherein:
a light transmittance of a part of the second light guide area close to the first light guide area is less than a light transmittance of a part of the second light guide area away from the first light guide area.

19. The display device of claim 17, wherein:
an area of each of a portion of the openings in the first light guide area is less than an area of each of a portion of the openings in the second light guide area; and
an area of an opening of the portion of the openings in the second light guide area close to the first light guide area is less than an area of an opening of the portion of the openings in the second light guide area away from the first light guide area.

20. The display device of claim 11, wherein the display device further comprises a display panel, and the display panel is disposed opposite to the backlight module.

* * * * *